Nov. 2, 1954 M. RANDOLPH 2,693,366
COMBINATION FOLDING CARRIAGE AND CONTAINER THEREFOR
Filed Oct. 21, 1952 3 Sheets-Sheet 1
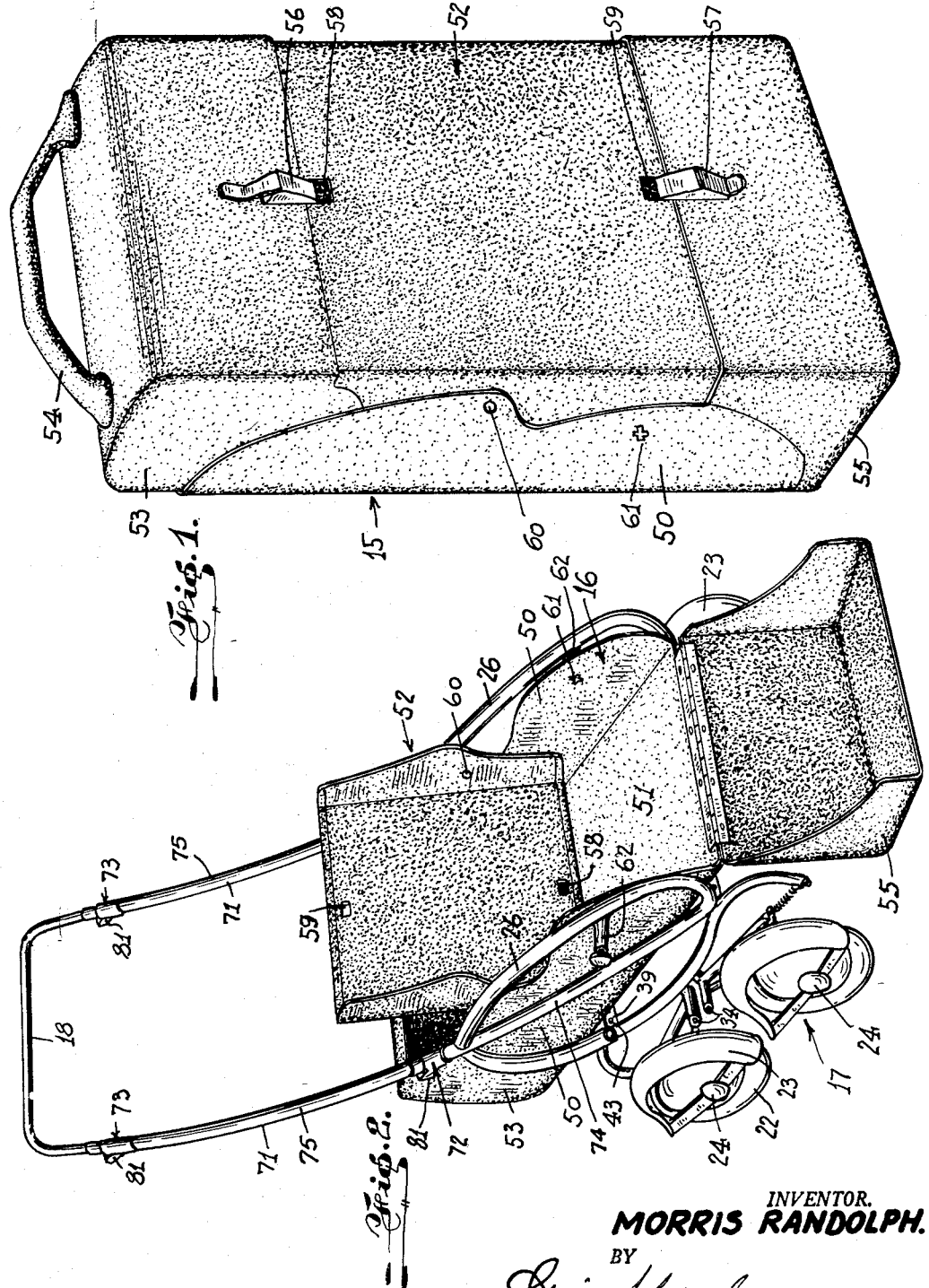
INVENTOR.
MORRIS RANDOLPH.
BY
ATTORNEY.

Nov. 2, 1954  M. RANDOLPH  2,693,366
COMBINATION FOLDING CARRIAGE AND CONTAINER THEREFOR
Filed Oct. 21, 1952  3 Sheets-Sheet 2

INVENTOR.
MORRIS RANDOLPH.
BY
ATTORNEY.

Nov. 2, 1954     M. RANDOLPH     2,693,366
COMBINATION FOLDING CARRIAGE AND CONTAINER THEREFOR
Filed Oct. 21, 1952     3 Sheets-Sheet 3
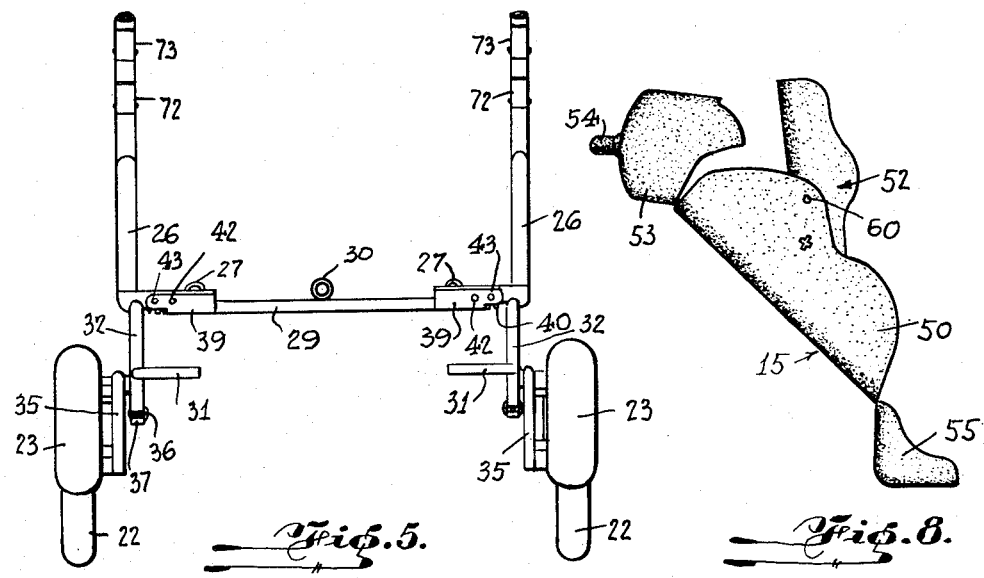
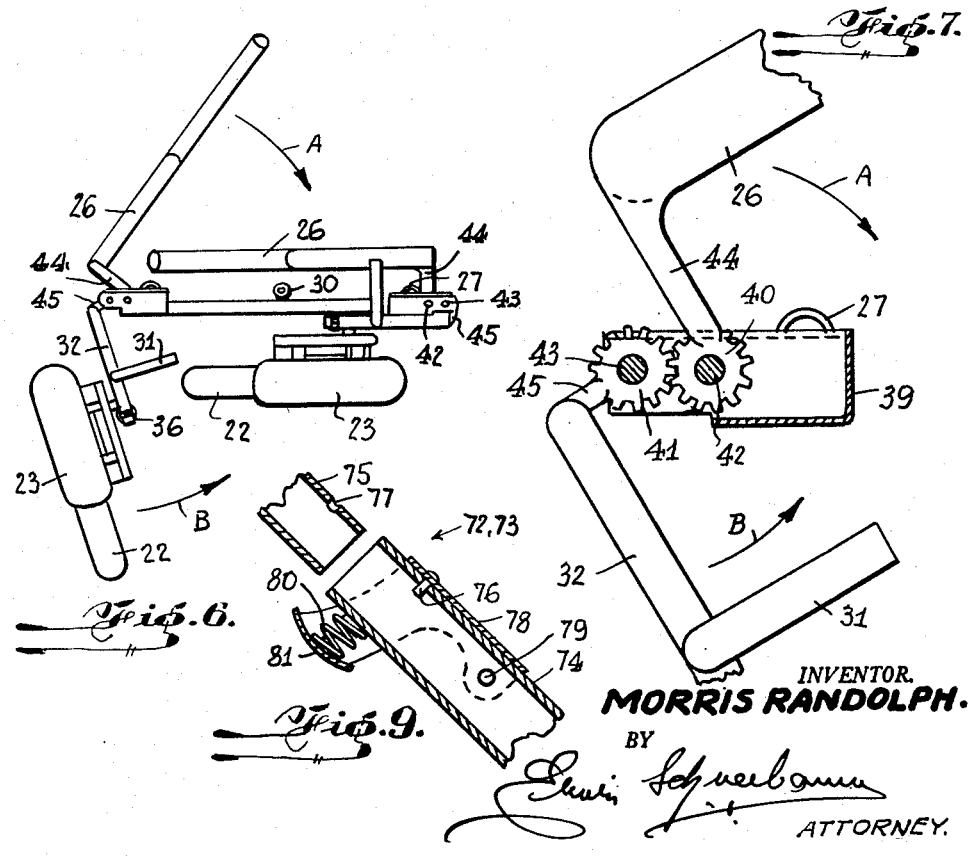
INVENTOR.
MORRIS RANDOLPH.
BY
ATTORNEY.

United States Patent Office 2,693,366
Patented Nov. 2, 1954

2,693,366

COMBINATION FOLDING CARRIAGE AND CONTAINER THEREFOR

Morris Randolph, Brooklyn, N. Y.

Application October 21, 1952, Serial No. 315,970

2 Claims. (Cl. 280—37)

This invention relates broadly to baby carriages, and more specifically to the type of baby carriage which, when not in use, can be folded for easy storage or transportation, and which is commonly referred to as a folding carriage.

It is the principal aim of the present invention to provide a folding carriage, which comprises broadly a frame member and a seat member, the seat member being adapted to be removed from the frame member and is adapted to form a container for the folded frame member when the carriage is not in use.

A further advantage of the present invention resides in the provision of a folding carriage of this character the seat member of which comprises several hingedly connected sections which, when the carriage is not in use, can be removed and folded to form the back, front and sides of a container in which the folded frame member of the carriage may be placed.

And a still further purpose of the present invention lies in the provision of a frame member for a folding carriage, wherein the wheels are so supported on the frame member that they may be folded upon the underside of the frame member longitudinally.

A further aim of the present invention lies in the provision of a folding carriage of this character, wherein the wheels are so supported on the frame member that the frame member can be brought into operative position instantly by lifting one side of the wheel supporting frame, causing the other side to be automatically lifted to securely support the frame member and the seat placed thereupon.

And another object of the present invention resides in the provision of a folding carriage, wherein the wheels are mounted on the frame member by gears, so that they may be folded instantly and released instantly.

These and other meritorious aims and advantages, which will become more fully apparent as the description hereof proceeds, are attained by the novel construction, combination and arrangement of parts, hereinafter described, and illustrated in the accompanying drawing, forming a material component of this disclosure, and in which:

Figure 1 is a view in perspective of the seat member of a folding carriage made in accordance with the present invention, showing the several sections of the seat member folded to form a carrying case for the folded frame member of the carriage.

Figure 2 is a view in perspective of a folding carriage of the present invention in operative position.

Figure 5 is a left hand view of Figure 3.

Figure 6 is a view similar to Figure 5, but showing one side of the frame member partly folded.

Figure 7 is a fractional detail view of the gear arrangement, whereby the frame member is folded, drawn to an enlarged scale.

Figure 8 is a side view of the seat member of the carriage, showing the several sections which may be folded to form a carrying case for the folded frame member; and Figure 9 is a fragmentary sectional view in detail of the tube locking mechanism.

Figure 4:
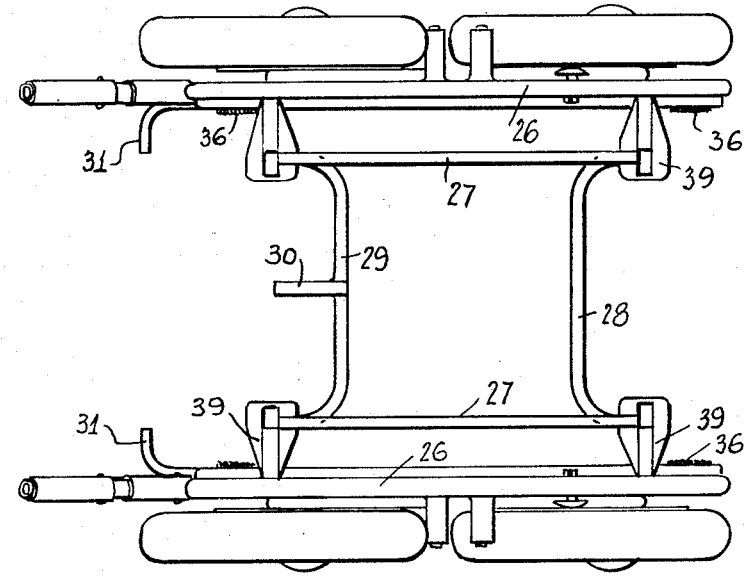
Figure 4 is a top plan view of the frame member illustrated in Figure 3.

Referring in greater detail to the drawings, the reference numeral 15 relates broadly to the container, which is formed by folding the seat member broadly referred to by the numeral 16, the numeral 17 refers broadly to the frame member, and numeral 18 designates the handle bar of the carriage.

Figure 3:
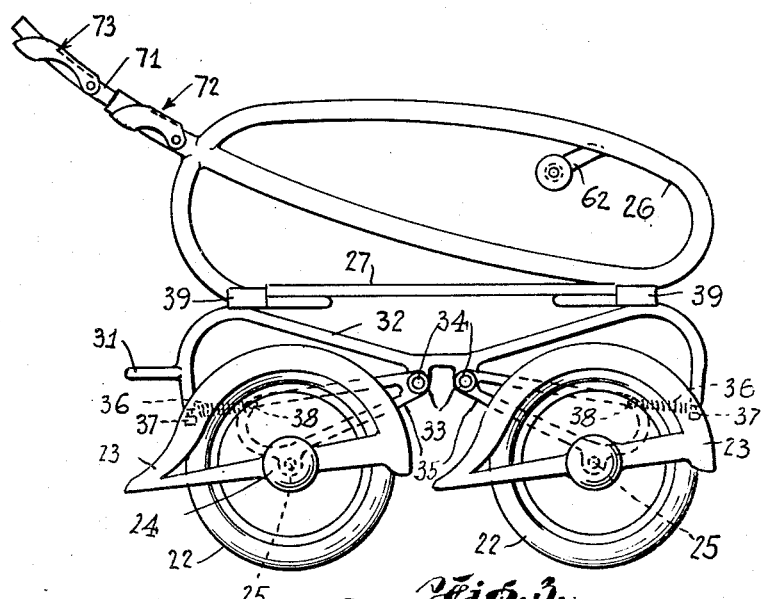
Figure 3 is a side elevational view of the frame member in operative position.

In more specific detail, the frame member 17 comprises a plurality of wheels 22, here illustrated as four in number, each of which is provided with a conventional mud guard 23, hub cap 24 and shaft 25. The upper portion of frame member 26 is curved, as shown in Figures 2 and 3 and forms, when the carriage is in operative position, the sides of the carriage. Sides 26 are joined at their lower ends by a transverse member 27 comprising a pair of spaced-apart bars, each of said bars extending substantially from the front wheel of the frame to the rear wheel, the two bars 27 being joined by a pair of spaced-apart bars 28 and 29, each of the said bars 28 and 29 extending from one of the bars 27 to the other, members 27, 28 and 29 forming substantially a square, as is illustrated in Figure 4. An auxiliary support 30 may be provided on member 29, if desired.

The lower portion of wheel frame 17 may be provided with an auxiliary section 32, section 32 being provided if desired with a foot rest 31 whereby the carriage may be tipped. Spacedly arranged on member 32 are a plurality of lugs 33 formed integrally with structure 32 on parts depending from the said structure, there being four such lugs, one for each of the wheels of the carriage. Each of the lugs 33 is provided with a pin 34, each of the said pins forming pivot mounting for the arms 35, each of the arms 35 extending from one of the lugs 33 to one of the wheels of the carriage. There are provided a plurality of springs 36, one for each of the wheels of the carriage, each of the said springs 36 having one of its ends secured, as at 37, to the auxiliary structure 32, the other end of each of said springs 36 being secured to one of the spring arms 35.

Gear boxes 39 are provided, one for each wheel, joining frame portions 27 and 32, each of said gear boxes containing a pair of gears, 40 and 41 respectively, the gears being in mesh with each other, gear 40 having a shaft 42 and gear 41 having a shaft 43 in the center thereof. Gear 40 has secured thereto an arm 44 which constitutes a part of frame portion 26 and gear 41 has secured thereto an arm 45 which constitutes a part of frame portion 32.

Seat member 16 comprises sides 50, a seat 51, a back rest 52, a cover 53, a foot rest 55, the outside of cover 53 being provided with a carrying handle 54, as shown in Figure 1. Centrally located near the outer edges of cover 53 and foot rest 55 are a pair of latches, respectively numbered 56 and 57, adapted to engage openings 58 and 59 respectively, whereby the container may be closed for carrying or storage. Back rest 52 is pivotally secured to sides 50, as at 60, and is provided at each side with a lock opening 61 adapted to be engaged by spring lock 62.

Curved frame portion 26 terminates in a pair of handle bar supports 71 for the removable handle bar 18. The said supports comprise a pair of hollow tubes 74 into which a pair of tubes 75 may be telescoped and retained in telescoped position by a pair of locks 72 and 73 respectively. A pin 76 extends into each of said tubes 74 adapted to engage openings 77 in each of said telescoping tubes 75. To lock each telescoping tube 75 in each of said tubes 74 each of said tubes 74 is provided with an arm 78 pivoted to each of said tubes as at 79, the pivotally secured arm 78 being actuated by spring 80 the outer end of which is provided with a knob 81.

The device operates as follows:

When it is desired to fold the carriage for transportation or storage, seat member 16 is lifted out of the frame section 17. The right hand wheels are then turned under the frame member, as is shown in Figure 6. Due to the gear arrangement hereabove described, this will cause the right hand side of frame member 26 to be folded upon the upper portion of the frame member. The same step is then taken with respect to the left hand side of the wheels with the same result. Prior thereto, handle bar 18 is removed by manually pressing against knobs 81 on each of the handle bar supports 71 to release the pins 76 from the openings in tubes 75 as explained. Tubes 75 are then telescoped into tubes 74 until pins provided for that purpose engage openings for that purpose near the ends of the said tubes. Foot member 55 is then raised and back rest 52 urged downwardly so that the foot member, seat and back rest form a straight surface, upon which the folded frame member 17 is placed. Then cover 53 is pivoted so that it will be positioned above and parallel with the seat member, and the back rest and foot member are each pivoted until the edge of the back rest and the edge of the foot member abut the respective edges of the cover in Figure 1. The latches are then secured in an obvious and well-known manner and the case may be carried by its grip 54.

When it is desired to use the carriage again, the latches are opened, the several parts of the carrying case lifted to form the seat member shown in Figure 2. By pressing against spring member 62, the frame member 17 is then removed from the seat member. In order to unfold frame member 17, the frame member is raised from the ground by grasping the left hand side of auxiliary member 26. Due to the gear arrangement, this will bring the left hand side into operative position and the right hand side will then automatically swing into position. Since the wheels are positioned at a point past dead center, they will remain in open or operative position, and the seat member is placed into its normal position. Pressure against knobs 81 near side members 26 will permit the telescoped tubes 75 to be withdrawn from tubes 74 until fully extended, whereupon handle bar 18 is placed thereon and locked in position by spring lock at 81.

Many modifications are possible and others will become apparent through use.

Foot rest 31 which may be provided or eliminated as desired, has for its purpose to allow the user to place his foot thereon when crossing the street or crossing obstacles, so that the carriage may be tilted for easier handling.

Thus there has been shown and described a combination folding carriage and container therefor in the preferred form of its embodiment, but it is to be understood that the present disclosure is to be regarded merely as descriptive and illustrative of the best known form and is not to be regarded as restrictive or limitative to the exact details shown, applicant reserving the right to make such changes and alterations in the construction of the invention as may come within the scope of the appended claims, without thereby departing either from the spirit or the scope of the present invention.

Having thus described the invention, what is claimed as new and desired to secure by Letters Patent, is:

1. A folding carriage comprising in combination a frame member and a seat member, said seat member comprising a cover section, a seat, said cover section pivotally secured to one end of said seat, a back rest, said back rest pivotally secured centrally of said seat, a foot rest section, said foot rest section pivotally secured to the other end of said seat, said frame member comprising an upper portion and a lower portion, handle bar support formed therewith, a plurality of gear boxes, one for each of the wheels of the carriage, a pair of gears in mesh in each of said gear boxes, said upper portion having a plurality of arms, each of said arms secured to one of said gears, the lower frame member having a plurality of arms, each of said arms secured to one of the other gears in each of said gear boxes whereby the upper portion and the lower portion of said frame member may be folded upon each other, the several sections of said seat member adapted to be turned to form a container for said folded carriage.

2. A folding carriage comprising in combination a seat member and a frame member, said seat member adapted to be placed upon said frame member when the carriage is in operative position, said seat member comprising a plurality of hingedly joined sections whereby said seat member may be folded to form a carrying case for said frame member when the latter is in folded position, said frame member comprising an upper portion and a lower wheel-supporting portion, a plurality of gear boxes, said gear boxes joining said upper and said lower portions, a pair of meshed gears in each of said gear boxes, one of said gears joined with said upper portion, the other of said gears in each gear box joined with said lower portion whereby said wheels and said upper portion may be folded upon each other, and a pair of uprights formed with said upper portion, a tube in each of said uprights adapted to telescope therein and a handle bar releasingly locked at the upper end of each of said tubes.

References Cited in the file of this patent

UNITED STATES PATENTS

| Number | Name | Date |
|---|---|---|
| 120,757 | Lutz | Nov. 7, 1871 |
| 863,972 | Ehlers | Aug. 20, 1907 |
| 1,022,094 | Kursten | Apr. 2, 1912 |
| 2,436,643 | Hafner | Feb. 24, 1948 |